United States Patent [19]

Bitzer et al.

[11] Patent Number: 4,565,631

[45] Date of Patent: Jan. 21, 1986

[54] BACKFLOW-TYPE SELF-CLEANING FILTER

[75] Inventors: Klaus M. Bitzer, Krefeld; Klaus Eimer, Ratingen; Klaus Grobe, Duisburg; Georg Mayer; Dieter Patzig, both of Ratingen, all of Fed. Rep. of Germany

[73] Assignee: Taprogge Gesellschaft mbH, Dusseldorf, Fed. Rep. of Germany

[21] Appl. No.: 562,866

[22] Filed: Dec. 19, 1983

Related U.S. Application Data

[63] Continuation-in-part of Ser. No. 477,814, Mar. 22, 1983, and a continuation-in-part of Ser. No. 477,862, Mar. 22, 1983.

[30] Foreign Application Priority Data

Dec. 17, 1982 [DE] Fed. Rep. of Germany ....... 3246718
Feb. 22, 1983 [DE] Fed. Rep. of Germany ....... 3306003

[51] Int. Cl.$^4$ .............................................. B01D 35/22
[52] U.S. Cl. .................... 210/333.1; 210/341; 210/411; 210/422; 210/427; 210/497.01
[58] Field of Search ............... 210/333.01, 333.1, 340, 210/341, 405, 409, 411, 412, 422, 423, 425, 427, 424, 426, 432.1, 433.1, 483, 493.1, 499, 497.01

[56] References Cited

U.S. PATENT DOCUMENTS

| | | | |
|---|---|---|---|
| 489,585 | 1/1893 | Johnson | 210/341 |
| 1,688,613 | 10/1928 | Cogan | 138/37 |
| 2,068,468 | 1/1937 | Phillips | 302/28 |
| 2,410,371 | 10/1946 | Vokes | 210/485 |
| 3,267,649 | 8/1966 | Vicard | 210/168 |
| 3,480,330 | 11/1969 | Hirs et al. | 55/286 |
| 3,530,989 | 9/1970 | Koethke | 210/340 |
| 3,703,465 | 11/1972 | Reece et al. | 210/333.1 |
| 4,092,907 | 6/1978 | Meyer et al. | 98/40 |
| 4,339,333 | 7/1982 | Sjoberg | 210/422 |
| 4,343,702 | 8/1982 | Riedel | 210/402 |
| 4,447,925 | 5/1984 | Riedel | 210/422 |

FOREIGN PATENT DOCUMENTS

| | | | |
|---|---|---|---|
| 4633464 | 4/1968 | Japan | 210/333.1 |
| 52-74570 | 6/1977 | Japan | 422/133 |
| 475494 | 11/1937 | United Kingdom | 210/340 |
| 507762 | 6/1939 | United Kingdom | 210/493 |

OTHER PUBLICATIONS

"Brackett Strain-O-Matic", published Hawker Siddeley Brackett Ltd.

Primary Examiner—Arnold Turk
Assistant Examiner—Titus B. Ledbetter, Jr.
Attorney, Agent, or Firm—Karl F. Ross; Herbert Dubno

[57] ABSTRACT

A self-cleaning filter installed in a cylindrical conduit for a liquid to be cleaned, such as cooling water for an industrial power plant, comprises a sieve spanning the conduit and undulating between an upstream and a downstream transverse plane. The interior of the conduit is divided into two or more sectoral compartments which are bounded by corresponding sieve segments on the downstream side and are provided with respective peripheral outlets leading to a drain, these outlets being normally closed by associated shutoff valves. To clean any sieve segment bounding a particular compartment, the upstream entrance to that compartment is obstructed by a flap valve while the corresponding shutoff valve is opened to generate a reverse flow across that sieve segment.

7 Claims, 22 Drawing Figures

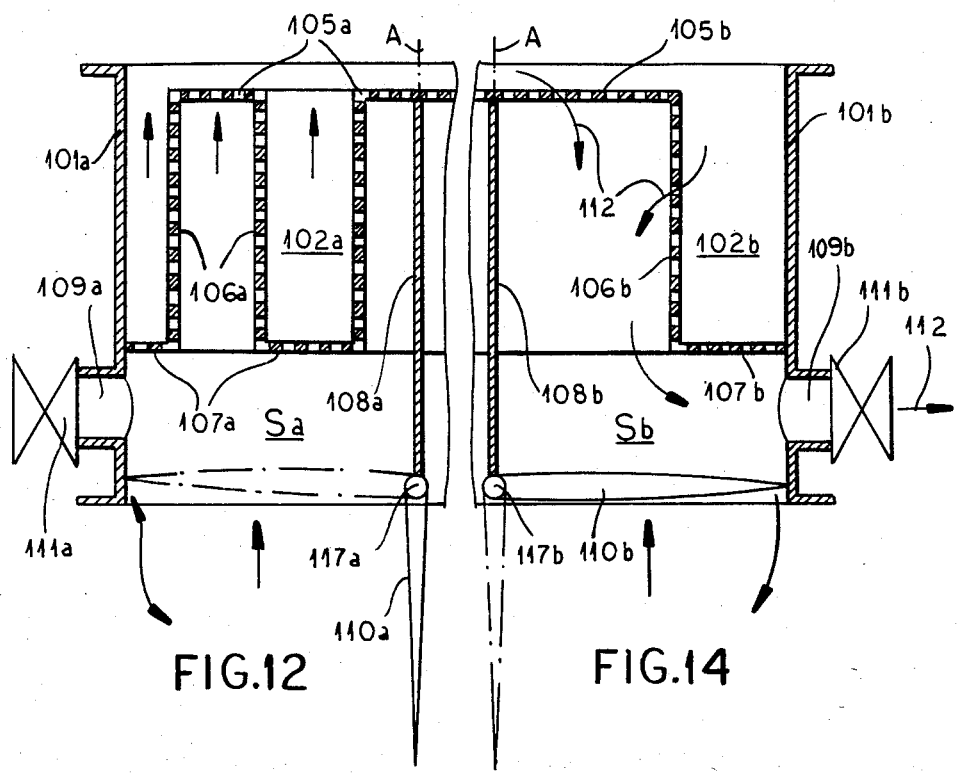
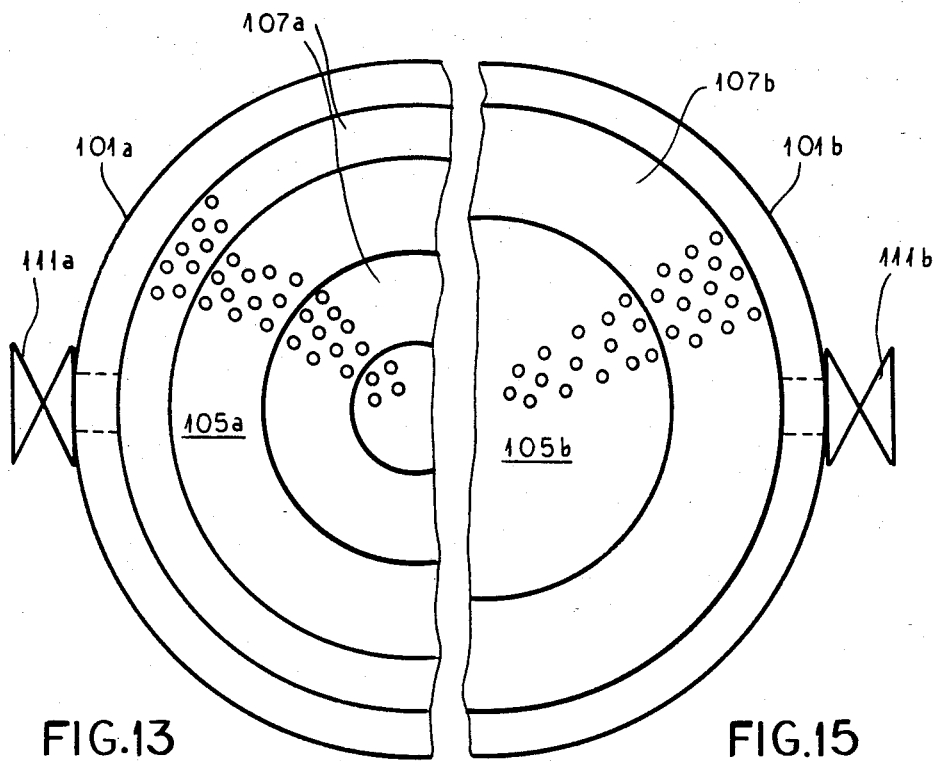
FIG.12  FIG.14
FIG.13  FIG.15

BACKFLOW-TYPE SELF-CLEANING FILTER

CROSS-REFERENCE TO RELATED APPLICATIONS

This is a continuation-in-part of our copending applications Ser. Nos. 477,814 and 477,862, both filed Mar. 22, 1983.

FIELD OF THE INVENTION

Our present invention relates to a self-cleaning filter for a conduit system serving for the circulation of a liquid, especially cooling water from a condenser stage of an industrial power plant.

BACKGROUND OF THE INVENTION

In filters of the type here contemplated, having a porous member (referred to hereinafter as a sieve) spanning a conduit for the circulating liquid, it has already been proposed to provide means operable from time to time for generating a localized reverse flow serving to dislodge matter accumulated on the upstream surface of certain parts of the sieve. Thus, a self-cleaning filter known under the designation Strain-O-Matic (produced by Hawker-Siddely Brackett Ltd. of Colchester, England) comprises a part-cylindrical sieve inserted in a conduit with its axis perpendicular to that of the latter and with a peripheral entrance wide open toward the upstream side of the conduit. The sieve is of accordion-pleated shape and forms a multiplicity of radially converging filter pockets intercepting the oncoming water. A cleaning arm swingable about the cylinder axis carries a head which obstructs, in a given position, a pair of spaced-apart filter pockets and connects an intervening pocket to a drain by way of a tubular shaft on which that arm is mounted. The resulting pressure differential gives rise to a localized reverse flow through the intervening pocket.

In order to minimize the flow resistance of the filter, the sieve has a radius of curvature about equal to the conduit radius and must therefore be surrounded by an even wider housing interconnecting the upstream and downstream conduit portions between which it is inserted. The device, accordingly, is quite bulky and each reverse-flushing position allows only a small part of the filter surface to be cleaned; moreover, the scanning motion of the arm requires a rather complex stepping drive.

OBJECT OF THE INVENTION

Thus, the object of our present invention is to provide a simpler and more efficiently operable self-cleaning filter of the general type referred to.

SUMMARY OF THE INVENTION

The filter according to our invention has a cylindrical housing which is axially traversed by the liquid to be cleaned, e.g. cooling water from a condenser stage of a power plant, and which therefore acts as a conduit for the flow of that liquid. The interior of this housing or conduit is divided into a plurality of generally sectoral compartments, preferably an even number of them, by partition means constituted at least in part by perforated elements or strainers to form a sieve with respective segments bounding the compartments on their downstream side. Each compartment is provided, on its outer or its inner periphery, with a lateral outlet leading to a drain, this outlet being normally blocked by an associated shutoff valve. The compartments have wide-open entrances, upstream of their lateral outlets, which can be selectively obstructed by flap means in order to generate a reverse pressure differential across the respective sieve segment upon the concurrent unblocking of the corresponding outlet by the associated shutoff valve.

With the drain at atmospheric or possibly subatmospheric pressure, the sieve segment being cleaned is traversed by a backward flow sweeping adhering solids from the upstream surface of that segment into the unblocked outlet. The remaining compartment or compartments, whose entrances are unobstructed by the flap means, still carry the normal flow which helps generate the reverse pressure differential giving rise to the backflow.

The zone containing the compartments and the lateral outlets is bounded by two planes transverse to the conduit axis, i.e. an upstream plane containing the entrances and a downstream plane in which at least the edges of some sieve segments are located; the spacing of these planes is preferably about equal to the conduit radius. In a simple case with only two compartments, each lying on opposite sides of an axial plane of the conduit, the flap means may comprise a single sectoral swivel plate swingable about a pivotal axis perpendicular to the conduit axis, lying in the plane that separates the two compartments. With four compartments, lying in respective quadrants of the conduit, each compartment entrance could be closable by an individual swivel plate—e.g. one of butterfly type—or else we may use a single flap for each pair of adjoining compartments, the two flaps or swivel plates being swingable about a common diametrical axis.

In some instances, as where the sieve segments are inclined to the conduit axis, no additional partitions will be needed to separate the compartments from one another. The slanting segments could be either flat or curved, specifically conically or frustoconically, and those bounding a common compartment may meet at a ridge in the downstream plane. That ridge could extend radially or could be tangential to an imaginary circle, i.e. perpendicular to an axial midplane bisecting the respective compartment; with curved segments the ridge will preferably form an arc of a circle centered on the conduit axis.

In a general manner, the boundaries of the compartments undulating or meandering in a given axial plane of the conduit between two transverse planes (i.e. the aforementioned downstream plane and an intermediate plane) form lines that are curved or straight and, in the latter instance, include angles between zero and 90° with the direction of flow. Thus, the compartments can be designed as baskets with rims in one of these transverse planes supporting them on the inner conduit wall, bottoms in the other transverse plane, and jackets whose generatrices are generally parallel to the conduit axis; these jackets could be either cylindrical or frustoconical. Several such baskets may be coaxially nested and centered on the conduit axis.

Advantageously, in accordance with another feature of our invention, the flap means and the shutoff valves may be mechanically or electrically interconnected in a manner insuring the unblocking of a lateral outlet of a compartment whenever the entrance thereof is obstructed, but not at other times.

The term "normally blocked", as applied herein to the lateral compartment outlets, is intended to refer to the operational phase of a corresponding part of the filter, i.e. when the respective sieve section is traversed by the flow in the forward direction. This does not necessarily imply a longer duration for the blocked state of a given outlet compared to its unblocked state.

BRIEF DESCRIPTION OF THE DRAWING

The above and other features of our invention will now be described in detail with reference to the accompanying drawing in which:

FIG. 12 is an axial sectional view of half a filter constituting yet another embodiment;

FIG. 13 is a top view of the assembly shown in FIG. 12;

FIG. 14 is an axial sectional view, complementary to that of FIG. 12 illustrating a modification;

FIG. 15 is a top view of the assembly of FIG. 14;

SPECIFIC DESCRIPTION

Figure 1:
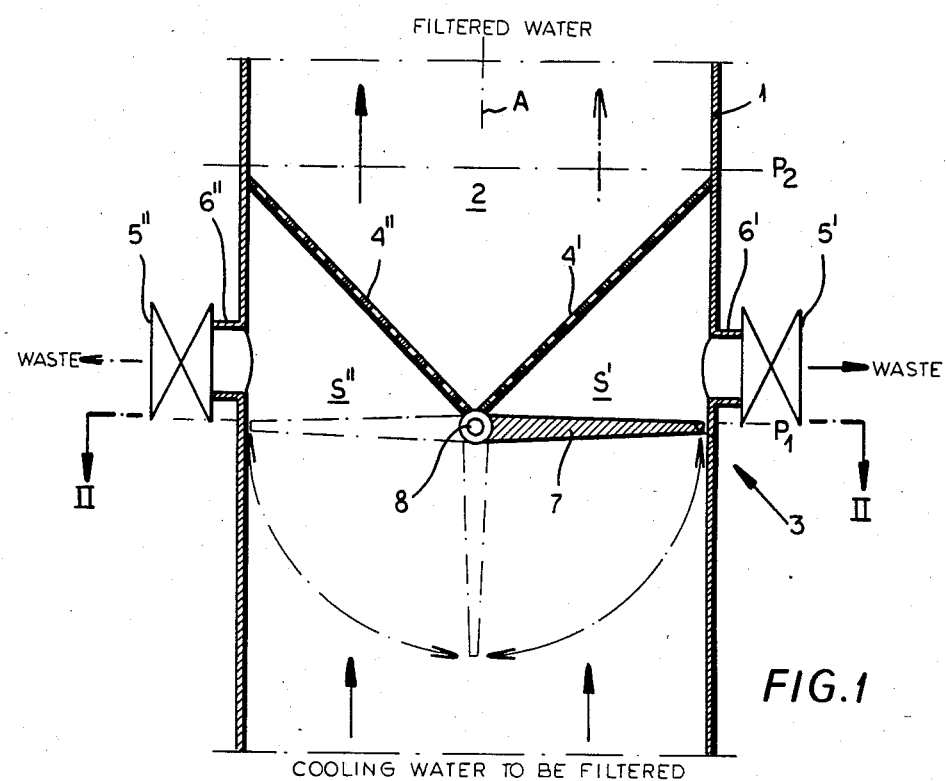
FIG. 1 is an axial sectional view of a filter according to our invention, installed in a conduit traversed by cooling water to be cleaned.
Figure 2:
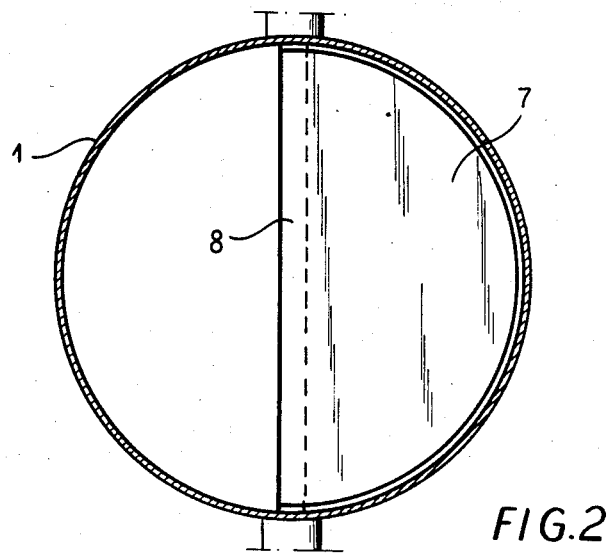
FIG. 2 is a cross-sectional view taken on the line II—II of FIG. 1.

In FIGS. 1 and 2 we have shown a filter 3 with a cylindrical housing 1, forming part of a conduit traversed by cooling water to be cleaned, whose interior is divided between a transverse upstream plane $P_1$ and a transverse downstream plane $P_2$ into two sectoral compartments S', S'' separated from a downstream space 2 by a pair of sieve segments 4' and 4''. These segments are inclined to the cylinder axis A at an angle of about 45°, diverging in the flow direction from a common diameter lying in the upstream plane $P_1$. Each compartment S', S'' is provided with a respective lateral outlet 6', 6'', located in the peripheral wall of conduit 1, which is closable by an associated shutoff valve 5', 5''. The aforementioned common diameter is also the site of a shaft 8 carrying a flap 7, designed as a swivel plate of semicircular outline, which is swingable—manually or otherwise—to occupy either of two cutoff positions or an intervening neutral position. One cut-off position, illustrated in full lines, obstructs the entrance of compartment S' and coincides with an opening of shutoff valve 5'; when the flap 7 is in its opposite cutoff position, obstructing the entrance of compartment S'', shutoff valve 5'' is opened while valve 5' is closed. During normal filtering operation, when flap 7 points upstream in line with axis A, both compartments are wide open to the oncoming flow which must pass through sieve segments 4' and 4'' since both lateral outlets 6' and 6'' are blocked.

With flap 7 swung into its right-hand cutoff position shown in FIGS. 1 and 2, the water continues to pass through the interstices of sieve section 4''; with valve 5' open, outlet 6' is connected to a nonillustrated drain under relatively low (atmospheric or subatmospheric) pressure whereby a pressure differential is generated across sieve segment 4' since the water pressure in space 2 exceeds that in compartment S'. The resulting reverse flow through sieve section 4' purges adhering solids from its underside and sweeps them out to the drain. In its alternate cutoff position indicated in phantom lines, flap 7 seals off the entrance of compartment S'' whereupon sieve section 4'' is cleaned by a backflow in the same manner.

The closure of shutoff valves 5' and 5'' during normal filtering operation, and the opening of one or the other of these valves in the respective cutoff position of flap 7, can be performed manually or through an automatic coupling by mechanical or electrical means. A mechanical coupling of particularly simple construction, usable with a different type of flap valve, will be described hereinafter with reference to FIGS. 9–11.

Figure 3:
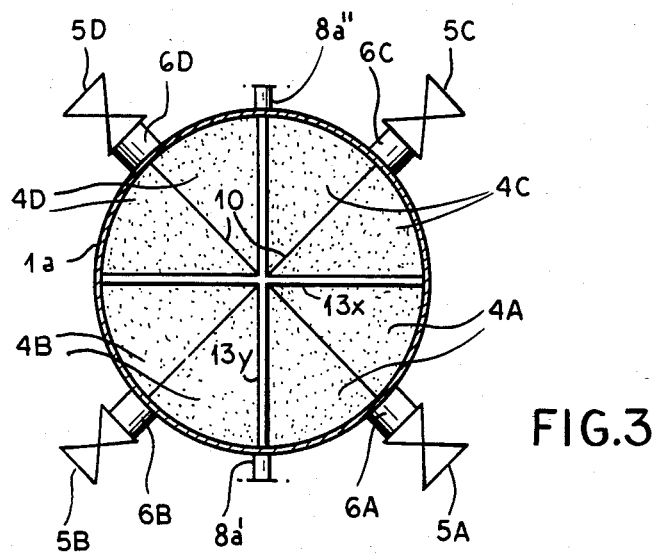
FIG. 3 is a cross-sectional view from above (with an upward flow direction as in FIG. 1) through a conduit provided with another filter embodying our invention.
Figure 4A:
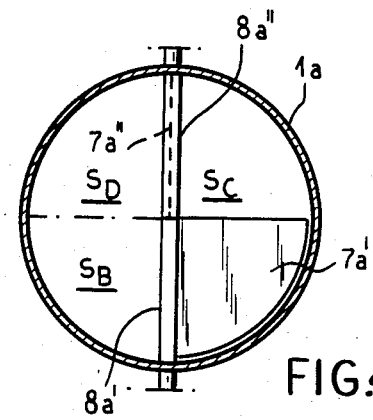
FIGS. 4A–4D are cross-sectional views of the filter of FIG. 3, analogous to FIG. 2, showing different positions of associated flap valves.
Figure 4C:
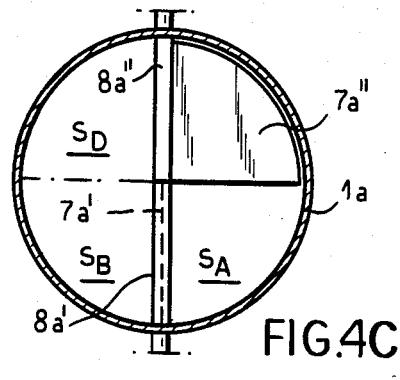
Figure 4B:
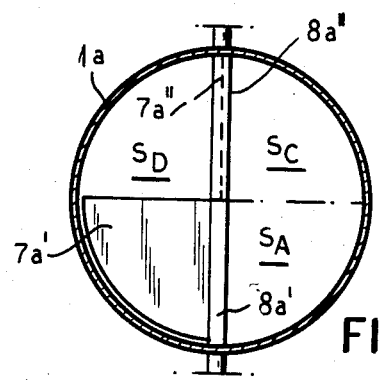
Figure 4D:
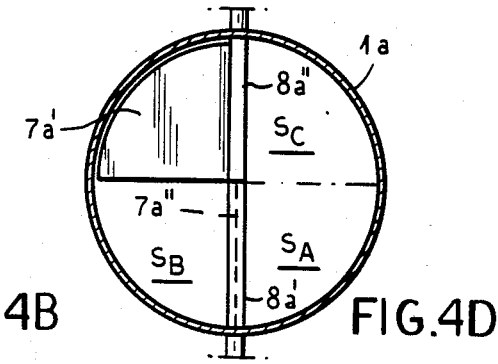

In FIG. 3 we have shown two intersecting fixed partitions 13x, 13y dividing a conduit 1a into four quadrants. These quadrants form respective filter compartments $S_A$, $S_B$, $S_C$, $S_D$, illustrated in FIGS. 4A–4D, whose downstream boundaries are gabled sieve segments 4A, 4B, 4C, 4D with radially extending ridges 10 lying in the downstream plane $P_2$ of FIG. 1. A pair of aligned shafts 8a', 8a'', replacing the shaft 8 of the preceding embodiment, carry respective flaps 7a', 7a'' of quadrantal outline which are swivelable about their common diameter in a manner similar to that of flap 7 in FIG. 1, i.e. between two cutoff positions and in intervening neutral position; the latter position is indicated by dotted lines in FIGS. 4A–4D. Thus, FIG. 4A shows flap 7a' obstructing the compartment $S_A$ while the other three compartments are normally operative; a corresponding outlet 6A (see FIG. 3) is simultaneously unblocked by a shutoff valve 5A while the other outlets 6B, 6C and 6D are blocked by respective shutoff valves 5B, 5C and 5D. FIG. 4B shows the same flap 7a' obstructing the compartment $S_B$ at which time only its outlet 6B is concurrently unblocked by valve 5B. In the position of FIG. 4C the flap 7a'' obstructs the compartment $S_C$ having an outlet 6C then unblocked by a valve 5C. FIG. 4D, finally, illustrates the alternate cutoff position of flap 7a'' obstructing the compartment $S_D$ whose outlet $6_D$ is concurrently unblocked by a valve $5_D$.

Figure 5:
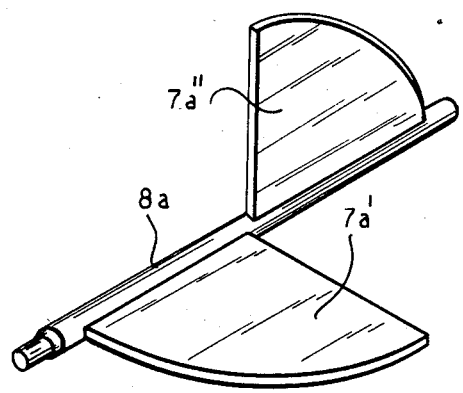
FIG. 5 is a perspective view of a possible structure of the flap valves shown in FIGS. 4A–4D.

FIG. 5 shows the two flaps or swivel plates 7a', 7a'' mounted on a single shaft 8a, with a relative offset of 90°, whereby one flap will be in one or in the other cutoff position while the other is parallel to the cylinder axis so as not to obstruct the flow. Such a flap structure, however, not only requires a downward extension of partitions 13x and 13y well below the upstream plane $P_1$, in order to let the flaps occupy the position illustrated for swivel plate 7a'' in FIG. 5, but also necessitates a cetain mobility and elasticity of at least a portion of partition 13y to let one or the other flap pass in the course of a full turn of shaft 8a.

With the two shafts 8a' and 8a" independently movable through 180°, as illustrated in FIGS. 4A–4D, partitions 13x and 13Y are not absolutely essential though they contribute to the rigidity of the filter structure.

Figure 7:
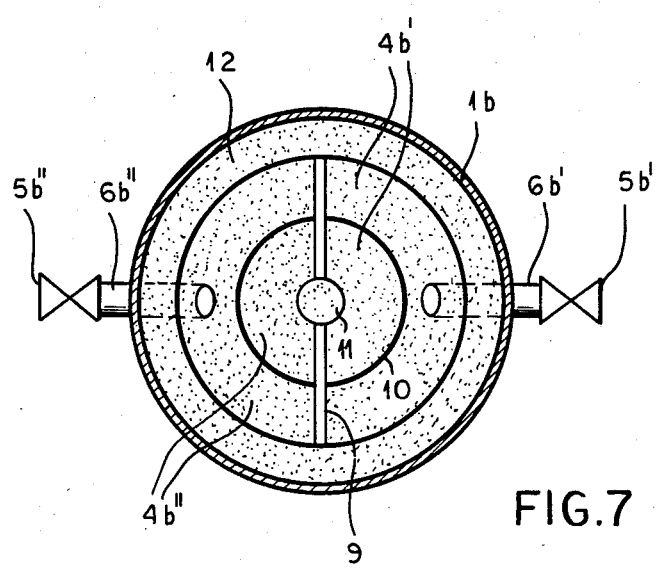
FIG. 7 is a cross-sectional view taken on the line VII—VII of FIG. 6.
Figure 6:
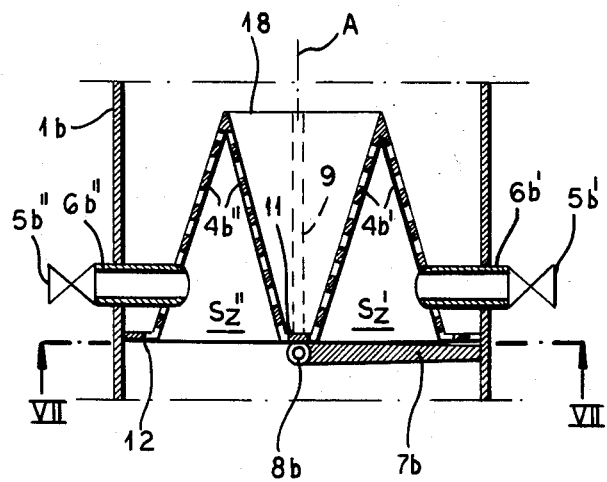
FIG. 6 is an axial sectional view generally similar to that of FIG. 1, illustrating a further embodiment of our invention.

In FIGS. 6 and 7 we have shown a filter housing 1b divided by a single axial partition 9 into two halves, a flap 7b being again swingable on a diametrically extending shaft 8b at the bottom edge of that partition. Each cylinder half of filter housing 1b accommodates a respective compartment $S_z'$, $S_z''$ bonded by a respective pair of sieve segments 4b', 4b" converging in the direction of flow at a common circular ridge 18 centered on conduit axis A. Thus, the two pairs of sieve segments define two coaxially nested frustocones tapering in opposite directions, namely an inner frustocone with a minor base 11 lying in the upstream plane and an outer frustocone with a major base in the same plane connected by an annular rim 12 with the peripheral wall of conduit 1b. This wall is penetrated by two radial tubes forming outlets 6b' and 6b" for compartments $S_z'$ and $S_z''$, the two outlets being again normally closed by shutoff valves 5b' and 5b" whose opening is correlated with the position of flap 7b.

Figure 8:
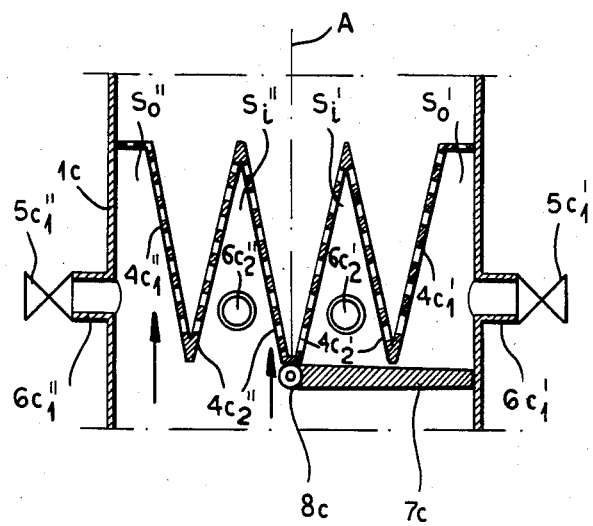
FIG. 8 is an axial sectional view illustrating yet another embodiment.

FIG. 8 illustrates another filter according to our invention whose housing 1c forms four outlets $6c_1'$, $6c_1''$ and $6c_2'$, $6c_2''$ for two other compartments $S_o'$, $S_o''$ and two inner compartments $S_i'$, $S_i''$, these outlets being again provided with respective shutoff valves of which only two, designated $5c_1'$ and $5c_1''$, have been illustrated. The four filter compartments are bounded by segments $4c_1'$, $4c_1''$, $4c_2'$, $4c_2''$ of an accordion-pleated sieve forming straight ridges in both the upstream and downstream planes. A diametrically extending shaft 8c, adjoining the middle ridge, carries a flap 7c which in its illustrated position obstructs the entrances of compartments $S_o'$ and $S_i'$; in its alternate cutoff position, compartments $S_o''$ and $S_i''$ are similarly obstructed. It will be understood that each of these cutoff positions coincides with the opening of the shutoff valves at the respective outlets.

Figure 9:
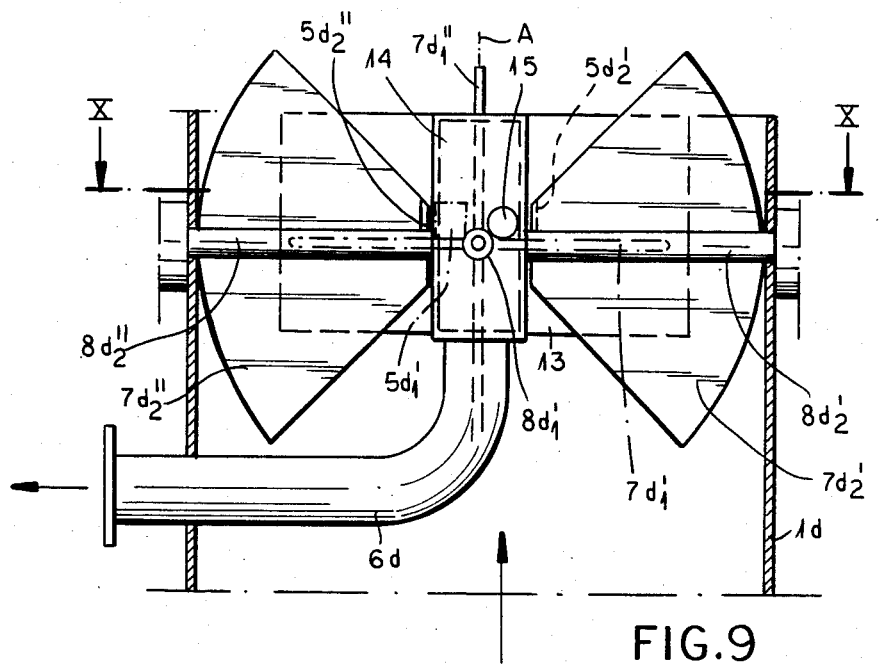
FIG. 9 shows, again in axial section, the lower part of a further filter according to our invention.
Figure 10:
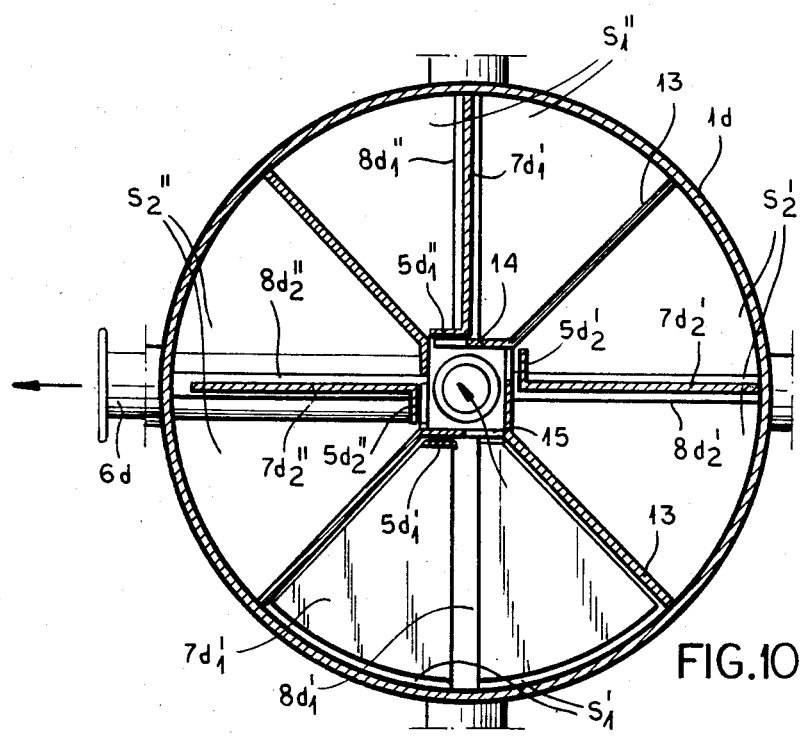
FIG. 10 is a cross-sectional view taken on the line X—X of FIG. 9.

As shown in FIGS. 9 and 10, a filter housing 1d is traversed by a single drain pipe 6d having an extremity centered on axis A. Four radially extending partitions 13 are integral with an upwardly closed prismatic box 14 surrounding that extremity and define four filter compartments $S_1'$, $S_1''$ and $S_2'$, $S_2''$ which are bounded on the downstream side by nonillustrated sieve segments of suitable shape, e.g. gabled as shown in FIG. 3. (with ridges lying well above the downstream edges of the partitions). The walls of the four-sided box 14 are provided with respective apertures 15 forming lateral outlets for the several filter compartments.

Four radially extending shafts $8d_1'$, $8d_1''$ and $8d_2'$, $8d_2''$, lying in the midplanes of compartments $S_1'$, $S_1''$ and $S_2'$, $S_2''$, carry respective flaps $7d_1'$, $7d_1''$ and $7d_2'$, $7d_2''$ which are designed as butterfly valves and are swivelable through 90° for either permitting or obstructing the flow of liquid through the respective compartments. The flaps have respective extensions $5d_1'$, $5d_1''$ and $5d_2'$, $5d_2''$ perpendicular to their pivotal axes which, in the cutoff position illustrated for flap $7d_1'$ in FIG. 10 and also in phantom lines in FIG. 9, unblock the corresponding oulet 15 which is otherwise blocked by the associated extension. Thus, extensions $5d_1'$ etc.

are the equivalent of the shutoff valves schematically illustrated in preceding Figures.

Figure 11:
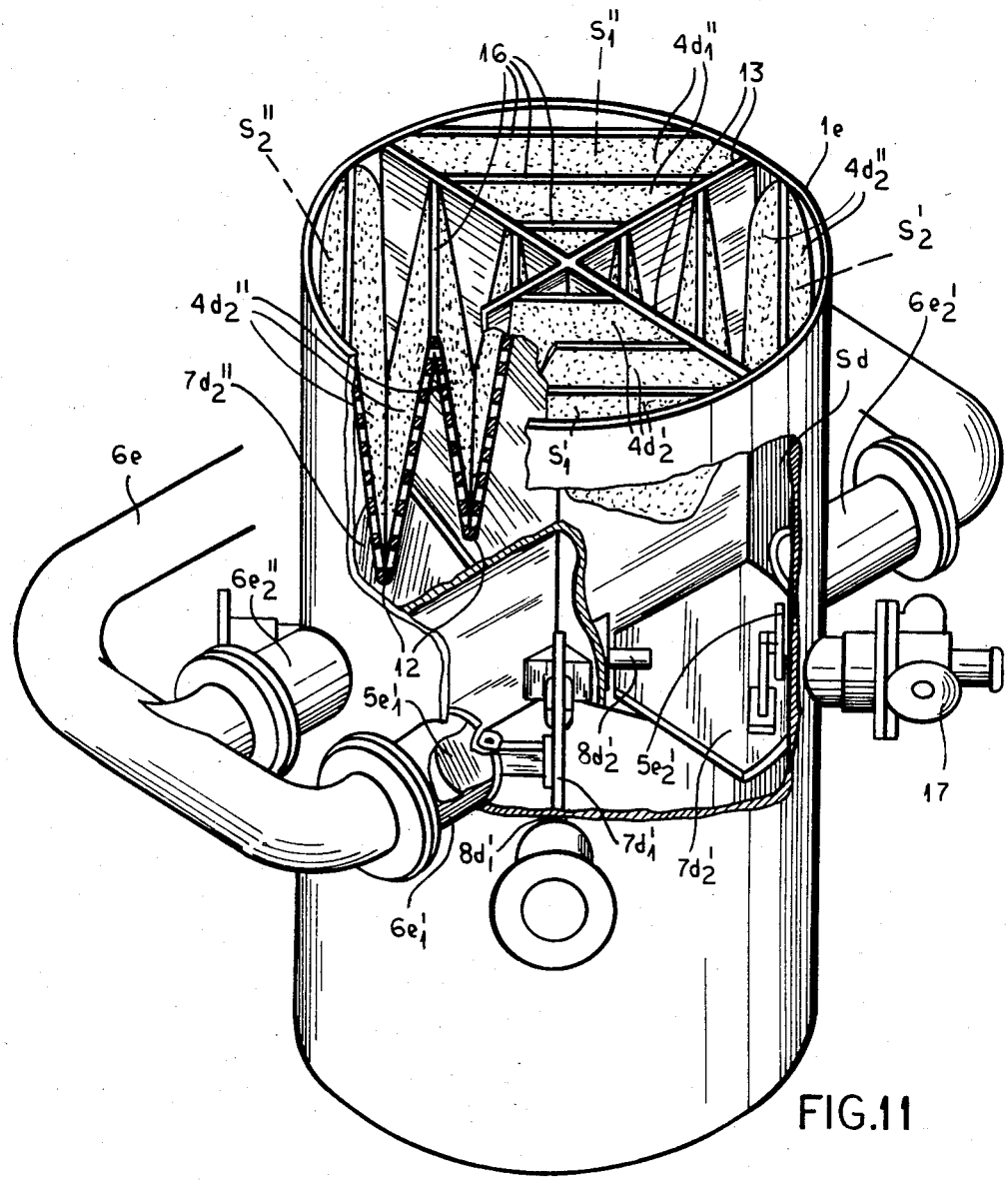
FIG. 11 is a perspective view, with parts broken away, of another filter including elements of FIGS. 9 and 10; p

FIG. 11 shows a housing 1e for a filter which is similar to that of FIGS. 9 and 10 in that its compartments, again designated $S_1'$, $S_1''$ and $S_2'$, $S_2''$, lie between partitions 13 and are selectively sealable against the incoming flow by butterfly-type swivel plates $7d_1'$ etc. carried on shafts $8d_1'$ etc. In this instance, however, the lateral outlets of the compartments lie on the circumference of the conduit, three of these outlets being shown at $6e_1'$, $6e_2'$ and $6e_2''$. All these outlets are joined to a common drain pipe 6e.

As particularly illustrated for flaps $7d_1'$ and $7d_2'$, each flap has an extension $5e_1'$, $5e_2'$ which is carried on a resilient stem and unblocks the respective outlet when the flap is swung into the transverse upstream plane to obstruct the entrance to the associated compartment. The rotation of the flap through 90° may be carried out by a servomotor 17 coupled with its shaft.

The four filter compartments are bounded on their downstream sides by groups of accordion-pleated filter segments $4d_1'$, $4d_1''$ and $4d_2'$, $4d_2''$ which in this instance form ridges 16 lying at right angles to the respective midplanes. These segments extend, of course, to the adjoining partitions 13 or to the inner wall surface of conduit 1e in order to prevent any unfiltered water from continuing through the conduit. The drives 17 of the several flaps could be automatically controlled by a programmer.

FIGS. 12 and 13 show part of a cylindrical filter housing 101a, again centered on an axis A, with a basket-like sieve structure forming two concentric cylinders bisected by a diametrically extending partition 108a. The cylinders have annular bottoms formed by sieve segments 105a in the downstream plane, rims formed by sieve segments 107a in another plane, and jackets formed by sieve segments 106a with generatrices parallel to axis A. The rims 107a connect the two coaxial cylinders to each other and to the surrounding wall of housing 101a. The interior of each cylinder half forms an extension of one of two filter compartments separated by partition 108a, one such compartment being designated Sa in FIG. 12 and being provided with a lateral outlet 109a served by a shutoff valve 111a. A flap 110a, similar to the swivel plate 7 of FIG. 1, is swingable on a shaft 117a adjoining the upstream edge of partition 108a for selectively cutting off the entrance of compartment Sa or of its companion compartment on the other side of the partition.

FIGS. 14 and 15 show a filter housing 101b with a similar sieve structure here including a single cylinder with a bottom 105b, a jacket 106b and a rim 107b. The interior of this cylinder, split by a partition 108b, forms extensions of two semicylindrical compartments whose entrances are selectively obstructable by a flap 110b carried on a shaft 117b. These compartments, as particularly illustrated for the one designated Sb, again have respective lateral outlets with associated shutoff valves as illustrated at 109b, 111b.

In FIG. 14 we have symbolized by arrows 112 a scavenging reverse flow coming into existence when compartment Sb is cut off by the flap 110b and the valve 111b is open. The pressure differential previously referred to drives the surrounding water from the downstream space 102b through sieve segments 105b, 106b and 107b—respectively constituting half of the bottom, the jacket and the rim of the cylindrical filter structure—into compartment Sb and then toward the drain via outlet 109b. A similar backflow occurs, of course, into the compartment Sa of FIG. 12 from the downstream space 102a when that compartment is sealed off by the flap 110a.

Figure 16:
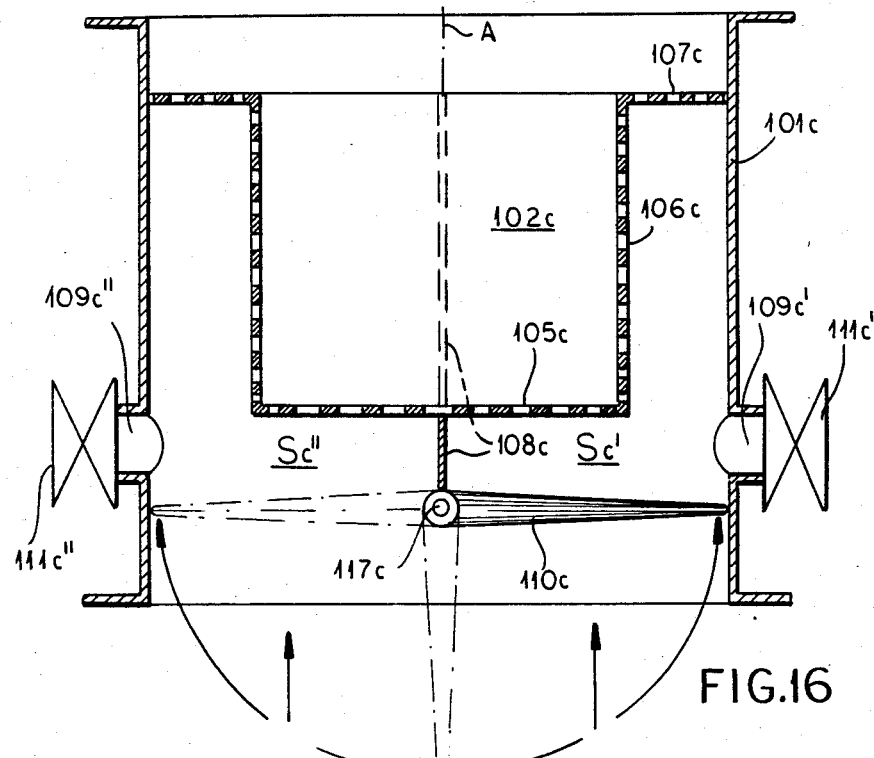
FIGS. 16, 17 and 18 are axial sectional views of additional embodiments.

FIG. 16 shows a filter structure similar to that of FIGS. 14 and 15 within a cylindrical housing 101c whose interior is again divided into two halves by a partition 108c. In this instance, however, a rim 107c of the cylindrical sieve structure lies in the downstream plane and is connected by a jacket 106c, with generatrices parallel to axis A, to a cylinder bottom 105c. Since the interior of sieve cylinder 105c, 106c is open toward the downstream space 102c, it does not contain an extension of partition 108c. Bottom 105c lies in an intermediate plane.

Two compartments Sc' and Sc" on opposite sides of this partition, selectively sealable by a flap 110c carried on a shaft 117c as in the two preceding embodiments, have respective lateral outlets 109c', 109c" provided with associated shutoff valves 111c', 111c". The operation is basically the same as that heretofore described.

Figure 17:
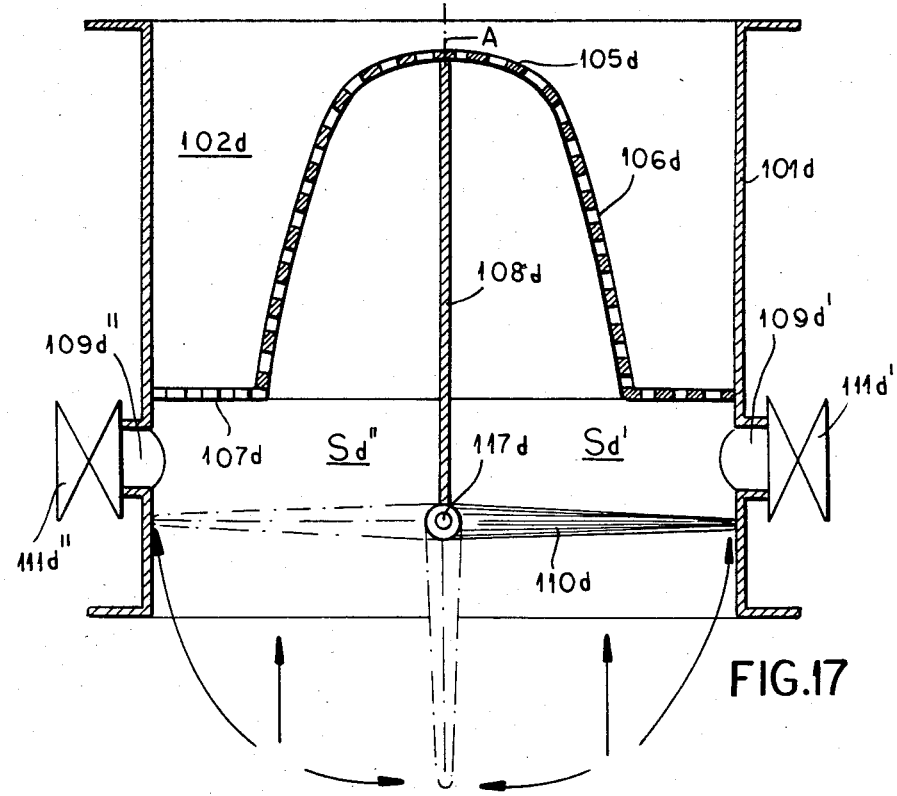

FIG. 17 shows a modification of the filter structure of FIGS. 14 and 15 in a housing 101d split into two halves by a partition 108d which also bisects the interior of a basket having a bottom 105d, a jacket 106d and a rim 107d secured to the inner housing wall. This basket differs from the one shown at 105b, 106b, 107b in FIGS. 14 and 15 in that its jacket 106d is of substantially frustoconical shape and its bottom 105d is concave; that bottom again lies downstream of the rim. Two compartments Sd' and Sd" on opposite sides of the partition 108d are selectively sealable by a flap 110d, carried on a shaft 117d, and have lateral outlets 109d', 109d" with shutoff valves 111d', 111d" operating in the aforedescribed manner. The downstream space surrounding the basket has been designated 102d.

Figure 18:
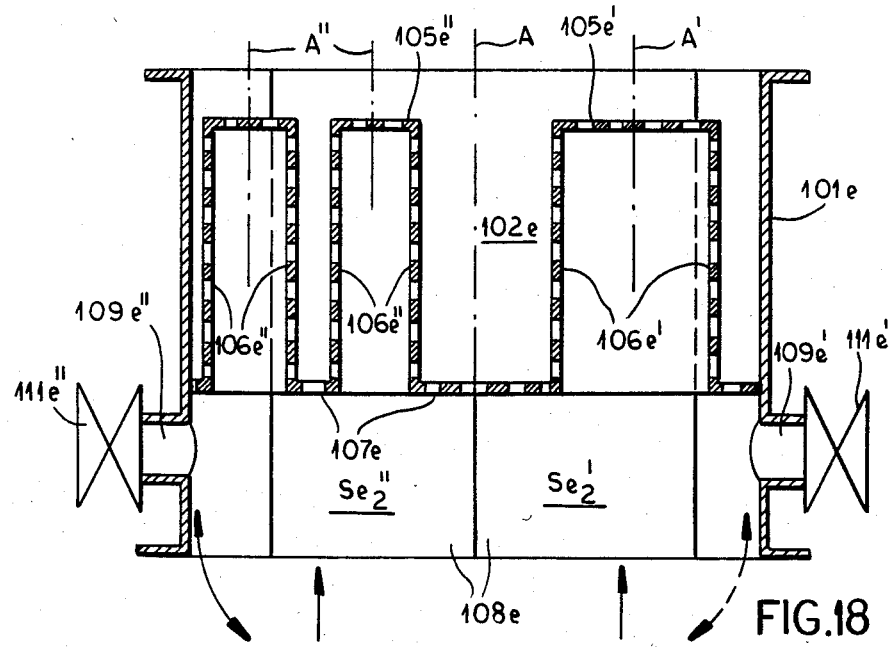
Figure 19:
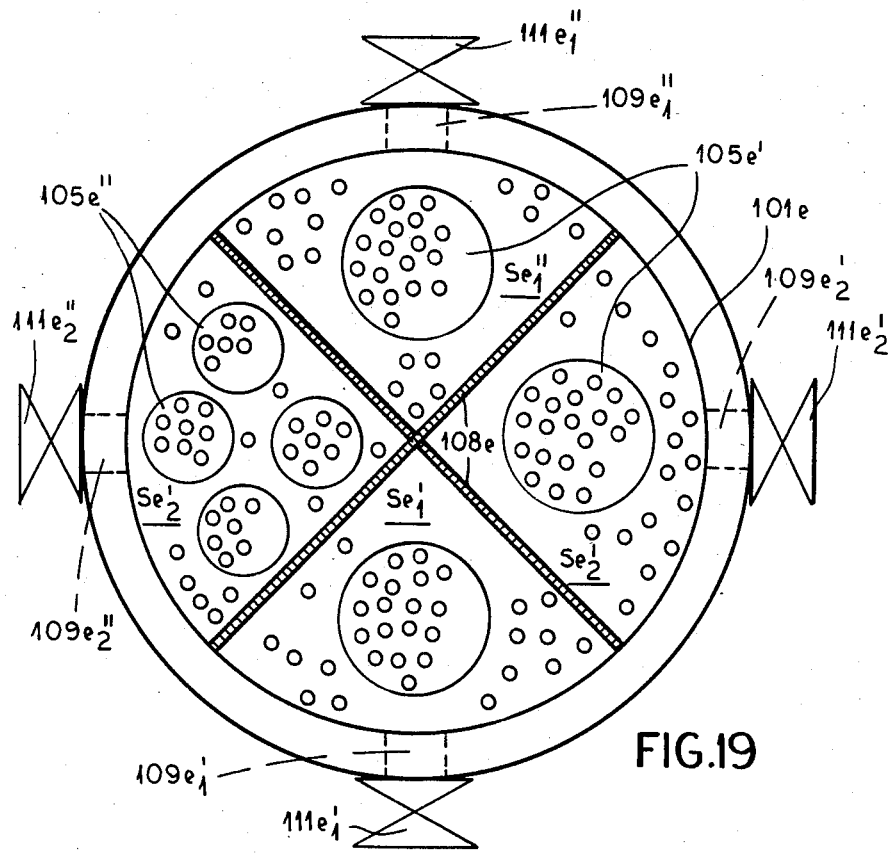
FIG. 19 is a top view of the embodiment of FIG. 18.

FIGS. 18 and 19 illustrate a further embodiment with a filter housing 101e divided into four quadrantal compartments $Se_1'$, $Se_1''$ and $Se_2'$, $Se_2''$ by intersecting partitions 108e, these compartments having respective outlets $109e_1'$, $109e_141$ and $109e_2'$, $109e_2''$ with associated shutoff valves $111e_1'$, $111e_1''$ and $111e_2'$, $111e_2''$. The compartments are bounded by a sieve structure with cylindrical baskets projecting into the downstream space 102e, namely a single basket with a bottom 105e' and a jacket 106e'—centered on an axis A' parallel to housing axis A—in the case of compartments $Se_1'$, $Se_2'$ and $Se_1''$ and a plurality of such baskets in the case of compartment $Se_2''$; the latter backets, centered on an axis A" parallel to housing axis A, have bottoms 105e" and jackets 106e". The several basket bottoms 105e', 105e" lie in a common downstream plane while the open ends of their jackets 106e', 106e" are interconnected by rims forming part of a web 107e secured in an upstream plane to the wall of housing 101e. The compartments are individually sealable by nonillustrated flap valves which preferably are similar to the butterfly-type swivel plates shown in FIGS. 9–11.

It will be understood that, in all the embodiments of FIGS. 12–19, only the sieve segments lying in or adjoining a downstream plane need to be perforated to act as strainers, namely the basket bottoms of FIGS. 12–15 and 17–19 and the basket rim in FIG. 16. The other constituents, including particularly the jackets, may be imperforate though their illustrated porous structure increases the effective sieve surface and reduces the flow resistance of the filter. It will also be apparent that the jackets of the baskets of FIGS. 12–16, 18 and 19 may be frustoconical instead of cylindrical, possibly with somewhat curved generatrices as shown for the structure of FIG. 17.

To the extent of structural compatibility, the various sieve configurations may be used with any of the several kinds of flap valves disclosed.

We claim:

1. A self-cleaning filter for use with a cylindrical conduit generally axially traversed by a liquid to be cleaned, comprising:
   (a) a cylindrical housing connectable to a conduit for generally axial flow of liquid therethrough;
   (b) substantially radial partition means located in said housing and extending generally axially therethrough between upstream and downstream planes transverse to the axis of said housing and dividing the interior of said housing into a plurality of compartments of generally sectoral shape as viewed axially of said housing, and said compartments being provided with wide-open entrances at their upstream boundaries;
   (c) respective sieve means associated with each of said compartments each for filtering the liquid flowing through its associated compartment, each of said sieve means including at least one substantially cylindrical portion having an axis oriented substantially parallel to the axis of said housing and further having first and second ends of which the former is unobstructed and the latter is not obstructed, a first substantially flat portion constituting a rim structure surrounding said first end of said substantially cylindrical portion and extending laterally therefrom to the proximate boundary surfaces of the associated compartment, a second substantially flat portion constituting the obstruction at said second end of said cylindrical portion and having its periphery spaced from said proximate boundary surfaces of the associated compartment and said cylindrical portion, and said first and second flat portions being perforated to form a sieve;
   (d) a plurality of drainage outlet ports incorporated in said housing and each communicating laterally with a respective one of said compartments, and a plurality of shutoff valve means associated with said drainage outlet ports, respectively, and normally activated to block the same to inhibit drainage of liquid from said compartments through said drainage outlet ports; and
   (e) respective flap means movably mounted in each of said compartments of said housing, said flap means each having a generally sectoral shape corresponding to that of the respective one of said compartments and being arranged in that compartment for selective disposition across the entire upstream boundary of the same to inhibit entry of liquid thereinto, and means operatively interconnecting each of said flap means and the associated one of said shutoff valve means which enables said shutoff valve means associated with any given compartment to be deactivated, so as to unblock the respective drainage output port, upon the respective one of said flap means being disposed across the upstream boundary of that compartment thereby closing said compartment while the other valves remain activated and the other compartments remain open;
   (f) of liquid through the respective sieve means associated with said given compartment, is generated when said shutoff valve means associated with said given compartment is deactivated, while the shutoff valve means associated with each other compartment remains activated and in its normal drainage blocking state, and while the flow of liquid through each such other compartment continues in order to dislodge filtered-out impurities from the upstream surface of said respective sieve means.

2. The filter defined in claim 1 wherein said drainage outlet ports are located at the circumference of said housing.

3. The filter defined in claim 1, further comprising a discharge pipe having an intake end coaxial with said housing and constituting an inner peripheral boundary of said compartments, said drainage outlet ports being provided in said intake end of said discharge pipe.

4. The filter defined in claim 1 wherein each of said flap means comprises respective swivel plate means associated with said compartments, and said shutoff valve means comprise respective extensions of said swivel plates adapted to register with and block the respective drainage outlet ports.

5. The filter defined in claim 1 wherein said radial partition means divides said housing into four compartments.

6. The filter defined in claim 1 wherein the distance between said first and second flat portions is substantially equal to the radius of said housing.

7. A device for mechanically cleaning a flow of cooling water from a condenser stage of a power plant, comprising:
(a) a cylindrical housing incorporable in a conduit traversable in a generally axial direction by a flow of cooling water;
(b) substantially radial partition means dividing the interior of said housing into a plurality of generally sectoral compartments;
(c) respective basket-shaped filter means in and extending across the entire cross-section of each of said compartments in said housing, each filter means including (i) at least one jacket having two ends and a generatrix oriented generally parallel to the housing axis, (ii) a peripheral rim member at one end of said jacket oriented transverse to the housing axis and securing said jacket to the proximate boundary surfaces of the associated compartment in said housing, and (iii) a bottom member generally parallel to said rim member and located at the opposite end of said jacket, each of said jacket and its associated rim and bottom members being perforated to form a sieve traversable by the flow;
(c) respective flap means in each of said compartments in said housing each selectively operable to obstruct the upstream entrance of the associated one of said compartments ahead of the respective filter means, said housing being provided with respective waste-discharge outlets opening into each of said compartments laterally of said housing and substantially perpendicularly to the flow direction therethrough, each of said outlets being located intermediate said upstream entrance to its associated compartment and the respective one of said sieves; and
(d) valve means at said outlets individually operable to unblock the waste-discharge outlet of any compartment when the upstream entrance to that compartment is obstructed by the respective one of said flap means, thereby to generate a reverse flow through the respective sieve for dislodging impurities from the upstream surface thereof.

* * * * *